United States Patent

Gustin

[11] Patent Number: 6,106,082
[45] Date of Patent: Aug. 22, 2000

[54] TRACK TENSION SYSTEM

[75] Inventor: Craig R. Gustin, Andover, Minn.

[73] Assignee: Caterpillar Paving Products Inc., Minneapolis, Minn.

[21] Appl. No.: 09/217,098

[22] Filed: Dec. 21, 1998

[51] Int. Cl.[7] ........................................ B62D 55/00
[52] U.S. Cl. ................................ 305/145; 305/153
[58] Field of Search ............................. 305/143, 144, 305/145, 149, 153

[56] References Cited

U.S. PATENT DOCUMENTS

| | | |
|---|---|---|
| Re. 36,284 | 8/1999 | Kelderman ............................ 305/144 |
| 2,837,379 | 6/1958 | Selyem et al. . |
| 3,101,977 | 8/1963 | Hyler et al. ........................... 305/145 |
| 3,463,559 | 8/1969 | Gehrke . |
| 3,477,766 | 11/1969 | Linsay ................................... 305/145 |
| 3,517,972 | 6/1970 | Williams . |
| 3,549,213 | 12/1970 | Smith et al. .......................... 305/145 |
| 3,647,270 | 3/1972 | Althaus ................................. 305/10 |
| 3,733,107 | 5/1973 | Cote et al. ............................ 305/149 |
| 3,847,416 | 11/1974 | Hicks et al. .......................... 280/481 |
| 3,972,569 | 8/1976 | Bricknell .............................. 305/144 |
| 4,007,826 | 2/1977 | Brown, Jr. et al. .................. 198/813 |
| 4,046,167 | 9/1977 | Papp et al. ............................ 138/31 |
| 5,378,204 | 1/1995 | Urvoy . |
| 5,482,126 | 1/1996 | Bouit et al. .......................... 180/9.1 |
| 5,488,787 | 2/1996 | Aoyagi et al. ........................ 37/348 |
| 5,491,913 | 2/1996 | Hutchinson .......................... 37/311 |
| 5,607,027 | 3/1997 | Puett, Jr. ............................... 180/242 |
| 5,738,421 | 4/1998 | Neymans et al. .................... 305/144 |
| 5,984,436 | 11/1999 | Hall ...................................... 305/145 |

FOREIGN PATENT DOCUMENTS

| | | | |
|---|---|---|---|
| 9946838 | 8/1976 | Canada ................................. 305/149 |
| 2909346 | 9/1979 | Germany ............................. 305/145 |
| 354097932 | 8/1979 | Japan ................................... 305/143 |
| 355051672 | 4/1980 | Japan ................................... 305/144 |
| 356047370 | 4/1981 | Japan ................................... 305/145 |
| 358180387 | 10/1983 | Japan ................................... 305/145 |
| 360226373 | 11/1985 | Japan ................................... 305/144 |
| 362258873 | 11/1987 | Japan ................................... 305/149 |
| 982 958 | 7/1981 | Russian Federation . |
| 1434440 | 5/1976 | United Kingdom ................. 305/145 |

*Primary Examiner*—S. Joseph Morano
*Assistant Examiner*—Long Bao Nguyen
*Attorney, Agent, or Firm*—Jeffrey A. Greene

[57] ABSTRACT

A tension management system is provided for an endless track laying work machine. A fluid cylinder maintaining tension within the endless track. A first accumulator provides recoil for normal operating conditions. If tension on the endless track increases beyond a normal recoil situation, fluid is bled off through a pressure relief arrangement to a second accumulator. The system requires an initial fluid charge from a fluid power unit, and is then disconnected and operates as a stand alone system.

13 Claims, 2 Drawing Sheets

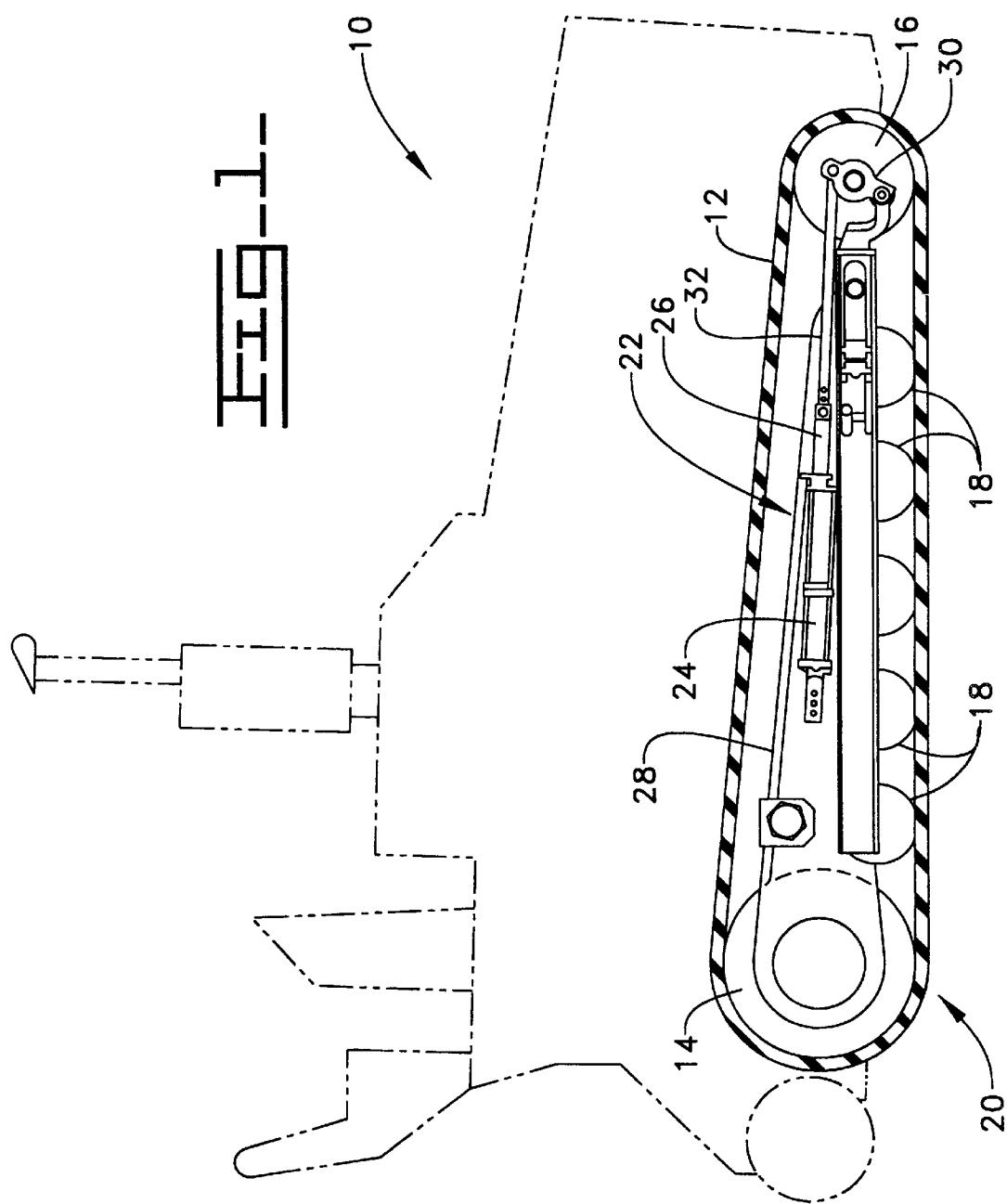

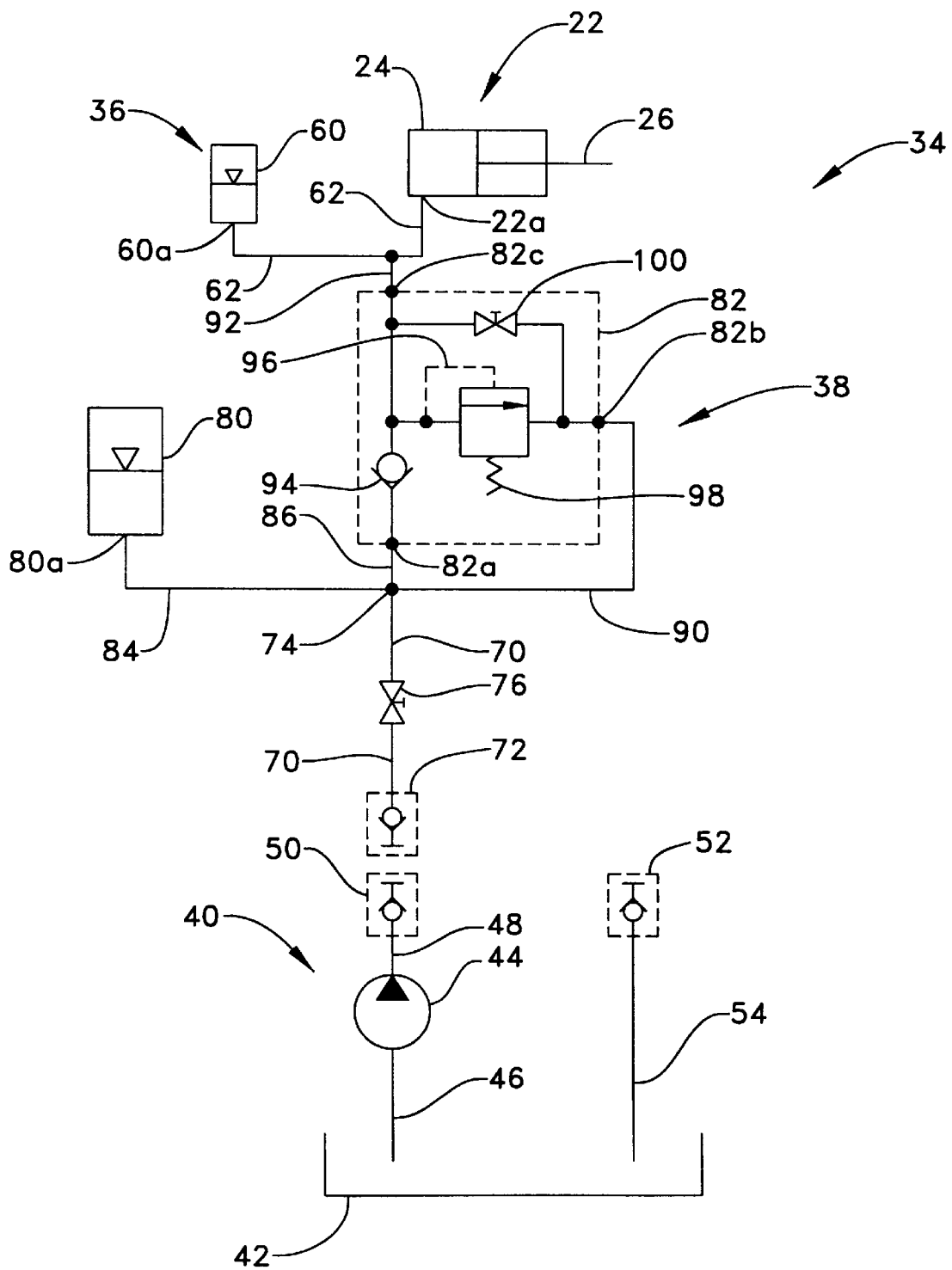
Fig_2_

_6,106,082_

TRACK TENSION SYSTEM

TECHNICAL FIELD

The present invention relates to a track system for a work machine, and more particularly to tension management for a track system.

BACKGROUND ART

A variety of tensioning systems for mobil machines driven on endless tracks have been used in the past. These systems provide tension on the endless track for motive effort. In the past some arrangements have included a lead screw and adjusting nut to advance an idler wheel away from a drive wheel in order to tension the endless track. However, this arrangement does not allow recoil or deviation of the chain or idler wheel during operation. Other arrangements have included additional components such as springs, grease filled systems, and complicated mechanical assemblies to provide tension and permit recoil.

Hydraulic systems are typically utilized today to provide tension and recoil functions on endless track laying machines. Systems are designed so that a range of operating conditions can be withstood. Components are sized to handle normal operating conditions as well as higher stresses to allow recoil and extreme tension requirements adding additional weight and cost. Some systems are complicated and use various monitoring apparatus, such as pressure sensors to measure hydraulic system pressure, or position sensors to sense the position of the idler wheel or tensioning cylinder. When a recoil event or high-pressure spike is sensed, fluid is bled off to a reservoir, lowering the pressure in the system, and then is reintroduced by a fluid supply pump when the pressure returns to a normal state.

The prior art tension and recoil systems described above require continuous attachment to a pressurized fluid supply source, use excessively robust components or sophisticated monitoring systems.

The present invention is directed to overcome one or more of the problems as set forth above.

DISCLOSURE OF THE INVENTION

In one aspect of the invention, a track roller assembly is comprised of an endless track and an idler wheel positioned in contact with the endless track. A fluid cylinder has an actuator rod that is mechanically coupled with the idler wheel. A first accumulator is in fluid communication with the fluid cylinder. A pressure relief arrangement is in fluid communication with the fluid cylinder and the first accumulator. A second accumulator is in fluid communication with the pressure relief arrangement.

In another aspect of the invention, a tension management system is provided with an idler wheel to apply tension on an endless track. A fluid cylinder is mechanically coupled with the idler wheel. A first accumulator is in fluid communication with the fluid cylinder. The first accumulator delivers an operation fluid to the fluid cylinder when a first accumulator pressure within the first accumulator is greater than a cylinder pressure within the fluid cylinder. The first accumulator receives the operation fluid from the fluid cylinder when the first accumulator pressure within the first accumulator is less than the cylinder pressure within the fluid cylinder.

BRIEF DESCRIPTION OF THE DRAWINGS

FIG. 1 is a diagrammatic elevational side view of a work machine supported by track roller assemblies embodying the present invention; and FIG. 2 is a schematic view of a fluid circuit of the work machine of FIG. 1.

BEST MODE FOR CARRYING OUT THE INVENTION

Referring to FIG. 1, a work machine 10 is shown, and is for example an asphalt paver but could be any track laying work machine. The work machine 10 includes an endless track 12, such as a rubber belt, a drive wheel 14, an idler wheel 16, and a plurality of track supporting rollers 18, collectively referred to as a track roller assembly 20. It should be recognized that a track roller assembly 20 is positioned on each of the opposite sides of the work machine 10. In as much as each track roller assembly 20 is substantially operatively and structurally similar, further reference will be made to only a single side of the work machine 10.

The idler wheel 16 maintains tension on the endless track 12 so as to prevent the endless track 12 from derailing or slipping over the drive wheel 14. In particular, the idler wheel 16 is coupled to a fluid cylinder 22 which urges the idler wheel 16 towards and away from drive wheel 14.

FIG. 1 further shows the relationship between the idler wheel 16 and the fluid cylinder 22. The fluid cylinder 22 includes a housing 24 and an actuator rod 26. The housing 24 is pivotally connected to a track frame 28 of the work machine 10. The actuator rod 26 is pivotally connected to one end of a swing link 30 by a linkage 32. Swing link 30 is pivotally connected to the track frame as by pin.

The idler wheel 16 is rotatably connected to a middle portion of the swing link 30. Hence, the swing link 30 and therefore the idler wheel 16 is urged away from the drive wheel 14 when the actuator rod 26 is extended out of the housing 24, hence placing a predetermined amount of tension on the endless track 12. Similarly, the swing link 30 and therefore the idler wheel 16 is urged towards the drive wheel 14 when the actuator rod 26 is retracted into the housing 24, relieving the tension on the endless track 12.

Referring now to FIG. 2, the fluid cylinder 22 is shown in fluid communication with a fluid circuit 34. The fluid circuit 34 includes a recoil apparatus 36, an over-pressure arrangement 38, and a fluid power unit 40.

The fluid unit 40 includes a fluid reservoir 42 for storing an operation fluid, such as oil. The operation fluid is drawn by a pump 44 from the fluid reservoir 42 through an inlet or suction line 46 and delivered through an outlet or supply line 48. Connected to supply line 48 opposite the pump 44 is a quick disconnect fitting 50. The fluid unit 40 is also provided with a quick disconnect fitting 52 for returning the operation fluid back to the fluid reservoir 42 through a drain line 54.

The recoil apparatus 36 is for example a first accumulator 60 that is in fluid communication with the fluid cylinder 22. In particular, a conduit 62 couples the port 60a of the first accumulator 60 to the head end port 22a of the fluid cylinder 22. The first accumulator 60 includes a bladder (not shown) with a compressed gas such as nitrogen therein. The gas exerts a first accumulator pressure on the operation fluid within the first accumulator 60 thereby urging the operation fluid into the conduit 62.

A fluid conduit 70 has a quick disconnect 72 attached to one end thereof. The other end of conduit 70 is coupled to one port of a manifold 74. Interposed the manifold 74 and the quick disconnect 72 is a first hand valve 76. First hand valve 76 can be any type of shut off valve for permitting fluid to be introduced into the circuit 34 under pressure, and maintained under pressure when the source is removed.

Also connected to the manifold 74 is the over pressure arrangement 38. The over pressure arrangement 38 is for example a second accumulator 80, and a pressure relief arrangement 82. The second accumulator 80 is similar in structure to first accumulator 60 except for having a generally larger fluid capacity.

Second accumulator 80 is in fluid communication with the pressure relief arrangement 82 which is preferably a two-position, pilot-actuated valve. In particular, a fluid conduit 84 couples a port 80a of the second accumulator 80 to the manifold 74. A fluid conduit 86 couples the pressure relief arrangement 82 via a first port 82a to the manifold 74. A fluid conduit 90 couples a relief port 82b of the pressure relief arrangement 82 to the manifold 74.

The pressure relief arrangement 82 is also in fluid communication with first accumulator 60 and the fluid cylinder 22. In particular, a second port 82c of the pressure relief arrangement 82 is coupled to the fluid conduit 62 via a fluid conduit 92.

The pressure relief arrangement 82 further includes a check valve 94, a pilot signal input line 96 and a spring 98. Check valve 94 is positioned between the first port 82a and the second port 82c. A biasing force created by the spring 98 urges the pressure relief arrangement 82 upwardly (relative to FIG. 2) into a first or fluid obstructing position as shown in FIG. 2. While the spring 98 in this example is shown having a fixed rate, it should be understood that a variable spring could be used. The biasing force of the spring 98 is overcome when a fluid pressure of a predetermined value is present on the pilot signal input line 96. Thereby, moving the pressure relief arrangement downwardly (relative to FIG. 2) into a second or fluid transmitting position. For example, a fluid pressure of 3000 psi present on the pilot signal input line 96 causes the pressure relief valve 82 to switch from the fluid obstructing position to the fluid transmitting position.

A second hand valve 100, which is integral with the pressure relief valve 82, is in fluid communication with the fluid cylinder 22, the first accumulator 60 and the second accumulator 80. In particular, a first fluid port of the hand valve is coupled to the fluid cylinder 22, and the first accumulator 60 via fluid conduits 62,92 and a second fluid port of the second hand valve 100 is coupled to second accumulator 80 via fluid conduits 84,90. The hand valves 76,100 are closed during normal operation of the work machine 10, but are opened to manually drain the accumulators 60,80 and the fluid cylinder 22. In particular, an operator of the work machine 10 may first connect quick disconnect fitting 52 and quick disconnect fitting 72. Then move hand valves 76,100 from a closed position to an open position and thereby cause the operation fluid within the accumulators 60,80 and the fluid cylinder 22 to drain back to the fluid reservoir 42. Draining the operation fluid is particularly useful so as to permit the removal of the endless track 12 (see FIG. 1) for repair or other service.

Industrial Applicability

In operation, the fluid power unit 40 is connected to the fluid circuit 34 via the quick disconnects 50,72. The fluid power unit 40 transmits the operation fluid to the port 80a of the second accumulator 80 through the pressure relief arrangement 82 in a direction from the first port 82a to the second port 82c. The operation fluid is then advanced through check valve 94 to the port 60a of first accumulator 60 and the head end port 22a of fluid cylinder 22.

As operation fluid enters and begins to fill the first and second accumulators 60,80 the bladders (not shown) therein are compressed, thereby increasing the first and second accumulator pressures. Similarly, as operation fluid enters the fluid cylinder 22, the actuator rod 26 is urged out of the housing 24. Operation fluid is delivered to the fluid circuit 34 until a desired pressure is obtained. The quick disconnects 50,72 are then uncoupled, leaving the fluid cylinder 22, the recoil apparatus 36, and the over pressure arrangement 38 as a self-contained system.

Thereafter, movement of the endless track 12 around the idler wheel 16 (see FIG. 1) causes variations in tension on the endless track 12. If tension on the endless track 12 increases, the actuator rod 26 is urged into the housing 24 thereby urging a portion of the operation fluid within the fluid cylinder 22 out of the fluid port 22a and into the fluid line 62. If the pressure relief arrangement 82 remains in the fluid obstructing position (as shown in FIG. 2) the operation fluid will advance into the first accumulator 60. As the operation fluid advances into the first accumulator 60, the bladder within first accumulator 60 is compressed thereby increasing the first accumulator pressure. The operation fluid will continue to enter the first accumulator 60 until the first accumulator pressure is of the same magnitude as the cylinder pressure.

If movement of the endless track 12 around the idler wheel 16 causes slack in the endless track 12 thereby decreasing the tension thereon, the force exerted on the actuator rod 26 by the idler wheel 16 is likewise decreased, thereby decreasing the cylinder pressure. Hence, the cylinder pressure is lesser in magnitude than the first accumulator pressure thereby causing a portion of the operation fluid within the first accumulator 60 to be urged from the first accumulator 60 to the fluid line 62 back to the cylinder 22. As the operation fluid advances into the fluid cylinder 22, the actuator rod 26 is extended. The operation fluid will continue to enter the fluid cylinder 22 until the cylinder pressure is of the same magnitude as the first accumulator pressure.

During operation, the work machine 10 may be backed up a steep incline under a heavy load or a large object may become lodged between the endless track 12 and either the idler wheel 16 or drive wheel 14. Such a situation will create a large increase in tension on the endless track 12, thereby causing the idler wheel to increase the force on the actuator rod 26 of the fluid cylinder 22. As described above, the actuator rod 26 will be urged into the housing 24 thereby increasing the cylinder pressure which causes a portion of the operation fluid within the fluid cylinder 22 to be advanced into the first accumulator 60.

If the actuator rod 26 is forced far enough into the housing 24 by the idler wheel 16, the volume of the operation fluid displaced from the fluid cylinder 22 may exceed a fluid capacity of the first accumulator 60. If the fluid pressure on the fluid line 62 and hence the pilot signal input line 96 increases to a predetermined level, the force exerted on the pressure relief arrangement 82 by the pilot signal input line 96 is greater in magnitude than the biasing force of the spring 98. Hence, the pressure relief arrangement 82 is moved downwardly (relative to FIG. 2) from the fluid obstructing position to the fluid transmitting position. Thereafter, the operation fluid is advanced from the first accumulator 60 and the fluid cylinder 22 to the second accumulator 80. As the operation fluid advances into the second accumulator 80, the bladder within second accumulator 80 is compressed thereby increasing the second accumulator pressure. The operation fluid will continue to enter the second accumulator 80 until the second accumulator pressure is of the same magnitude as the cylinder pressure and the first accumulator pressure.

After the object is dislodged, or the reversing action of the work machine 10 stops, the force exerted on the idler wheel 16 by the endless track 12 decreases. Thus, reducing the pressure in the fluid cylinder 22, the first accumulator 60, and the fluid line 62. The pressure will also be drop in the pilot line 96 causing the pressure relief mechanism 82 to move back to a fluid obstructing position. Fluid will then move from the second accumulator 80 through the check valve 94, and the first accumulator 60 to the fluid cylinder 22, thereby extending the cylinder rod 26 until the fluid system 34 returns to a normal operating state.

Moreover, if the need should arise to repair or otherwise service the undercarriage assembly 20 (see FIG. 1), it may be necessary to remove the endless track 12. In order to remove the endless track 12, the tension on the endless track 12 must first be reduced.

As described above, the first accumulator 60 and the fluid cylinder 22 cooperate as a recoil system 38 to dampen vibrations due to variations in the tension of the endless track 12 during normal operation of the work machine 10. The second accumulator 80 reduces the normal operating pressure encountered by system components, the need for a larger more expensive accumulator to accommodate temporary jolts, and while avoiding the need to repeatedly recharge the system if a relief valve alone were provided. The reduction of such vibrations reduces the occasions of surging or other ride anomalies which in turn increases the quality of the work being performed by the work machine 10 (e.g. the application of asphalt).

What is claimed is:

1. A track roller assembly, comprising:
    an endless track;
    an idler wheel positioned in contact with said endless track;
    a fluid cylinder having an actuator rod, said actuator rod being mechanically coupled with said idler wheel;
    a first accumulator in fluid communication with said fluid cylinder;
    a pressure relief arrangement having a first port, a second port, and a pressure relief port, said second port being in fluid communication with said fluid cylinder and said first accumulator; and
    a second accumulator in fluid communication with said first port and said relief port of said pressure relief arrangement.

2. The track roller assembly of claim 1, wherein:
    an operation fluid is delivered through said pressure relief arrangement to said second accumulator when a pressure within said fluid cylinder is greater than a biasing spring force in the pressure relief arrangement.

3. The track roller assembly of claim 2, wherein:
    said pressure relief arrangement further comprising a check valve being positioned between said first and said second ports, wherein said first accumulator and said fluid cylinder receive said operation fluid from said second accumulator when said pressure within said fluid cylinder drops below the pressure within said second accumulator.

4. The track roller assembly of claim 1, wherein:
    said first accumulator and said second accumulator each are gas charged.

5. The track roller assembly of claim 1, wherein:
    said pressure relief arrangement has a fluid obstructing position and a fluid transmitting position, said fluid transmitting position being dependent on the pressure in said fluid cylinder,
    an operation fluid is transmitted from said first accumulator to said second accumulator when said pressure relief arrangement is in said fluid transmitting position, and
    said first accumulator is isolated from said second accumulator when said pressure relief arrangement is in said fluid obstructing position.

6. The track roller assembly of claim 5, wherein:
    said pressure relief arrangement includes a pilot signal input line,
    said pressure relief arrangement is positioned in said fluid obstructing position when said pilot signal input line possess a first pressure value, and
    said pressure relief arrangement is positioned in said fluid transmitting position when said pilot signal input line possess a second pressure value.

7. A The track roller assembly of claim 1, further including:
    a first hand valve having an open position and a closed position,
    an operation fluid is transmitted from said first accumulator to said second accumulator when said first hand valve is located in said open position, and
    said first accumulator is isolated from said second accumulator when said first hand valve is located in said closed position.

8. The track roller assembly of claim 1, wherein:
    said fluid circuit includes a check valve in fluid communication with said first accumulator and said second accumulator,
    said check valve permits an operation fluid to flow from said second accumulator to said first accumulator, and
    said check valve prevents said operation fluid from flowing from said first accumulator to said second accumulator.

9. A tension management system for maintaining tension on an endless track, comprising:
    an idler wheel for applying force to said endless track;
    a fluid cylinder mechanically coupled with said idler wheel; and
    a first accumulator in fluid communication with said fluid cylinder, wherein (1) said first accumulator delivers an operation fluid to said fluid cylinder when a first accumulator pressure within said first accumulator is greater than a cylinder pressure within said fluid cylinder, and (2) said first accumulator receives said operation fluid from said fluid cylinder when said first accumulator pressure within said first accumulator is less than said cylinder pressure within said fluid cylinder; and
    an over pressure arrangement in fluid communication with said first accumulator.

10. The tension management system of claim 9, wherein said over pressure arrangement includes:
    a pressure relief arrangement in fluid communication with said fluid cylinder and said first accumulator; and
    a second accumulator in fluid communication with said pressure relief arrangement.

11. The tension management system of claim 9, wherein:
    said fluid cylinder includes a head end and a rod end,
    said first accumulator is in fluid communication with said head end of said fluid cylinder.

12. The tension management system of claim 10, wherein said first and second accumulators include are gas charged.

13. The track roller assembly of claim 10, wherein:
    said pressure relief arrangement has a fluid obstructing position and a fluid transmitting position, said fluid transmitting position being dependent on the pressure in said fluid cylinder,
    an operation fluid is transmitted from said first accumulator to said second accumulator when said pressure relief arrangement is in said fluid transmitting position, and
    said first accumulator is isolated from said second accumulator when said pressure relief arrangement is in said fluid obstructing position.

* * * * *